United States Patent [19]

Leno

[11] 4,402,401
[45] Sep. 6, 1983

[54] OIL SPOUT CONTAINER

[76] Inventor: Lester L. Leno, 2441 Paramount Dr., Enumclaw, Wash. 90822

[21] Appl. No.: 314,751

[22] Filed: Oct. 26, 1981

[51] Int. Cl.³ .......................... F16N 33/00; B67C 9/00
[52] U.S. Cl. .................................. 206/216; 206/349; 141/86; 312/229; 220/DIG. 6
[58] Field of Search ............... 220/1 C, 18, 69, 23.83, 220/23.86, 352, 20.5, 85 H, 85 SP, 288, 355, 213; 72/703; 206/216; 232/1 E, 43.1, 43.3; 248/188.1, 309 R, 310; 184/88 R; 141/86, 98, 106, 364; 312/229

[56] References Cited

U.S. PATENT DOCUMENTS

| 63,283 | 3/1867 | Miller | 220/288 |
|---|---|---|---|
| 540,530 | 6/1895 | Willson | 220/18 |
| 558,332 | 4/1896 | Womble | 220/18 |
| 751,318 | 2/1904 | Maranville | 220/355 |
| 1,792,356 | 2/1931 | Boiseau | 220/DIG. 6 |
| 2,054,094 | 9/1936 | Murch | 220/355 |
| 2,654,508 | 10/1953 | Wright | 312/229 X |
| 3,654,969 | 4/1972 | Vazquez et al. | 141/106 |
| 3,791,423 | 2/1974 | Hildreth | 141/86 |

Primary Examiner—William T. Dixson, Jr.
Assistant Examiner—Bryon Gehman
Attorney, Agent, or Firm—Wells, St. John & Roberts

[57] ABSTRACT

An oil spout container is described. The container receives and holds an oil spout and provides for drainage from the container of oil dripping from the spout. Drained oil is accumulated; a cap is provided for the container to prevent dirt from contaminating the accumulated oil and the stored spout.

3 Claims, 3 Drawing Figures

U.S. Patent  Sep. 6, 1983  4,402,401
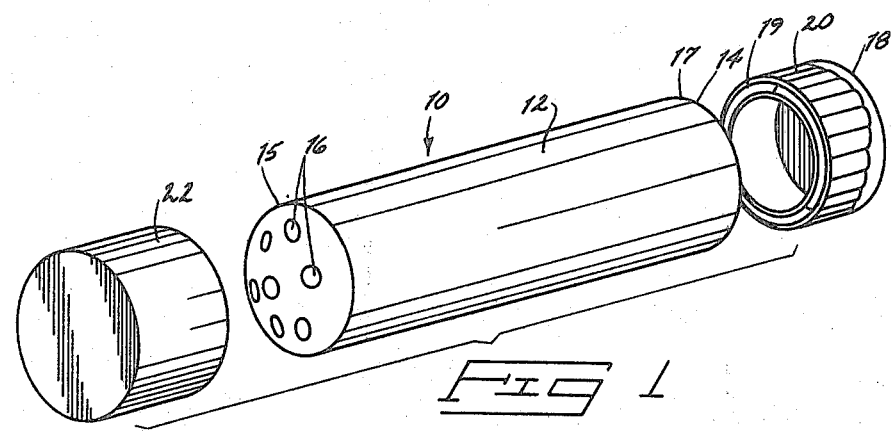
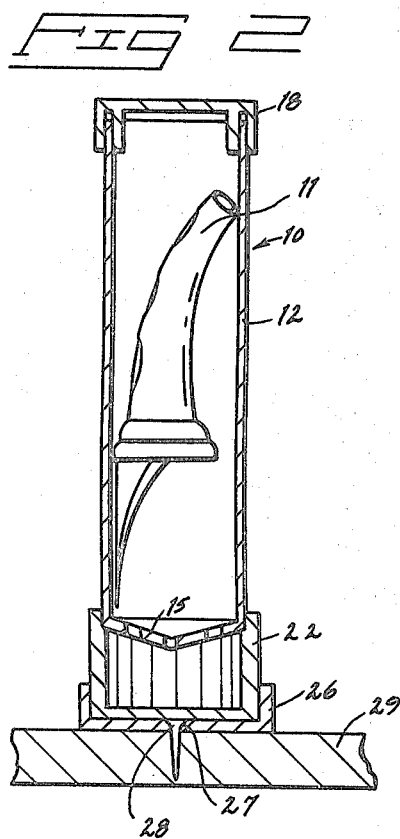 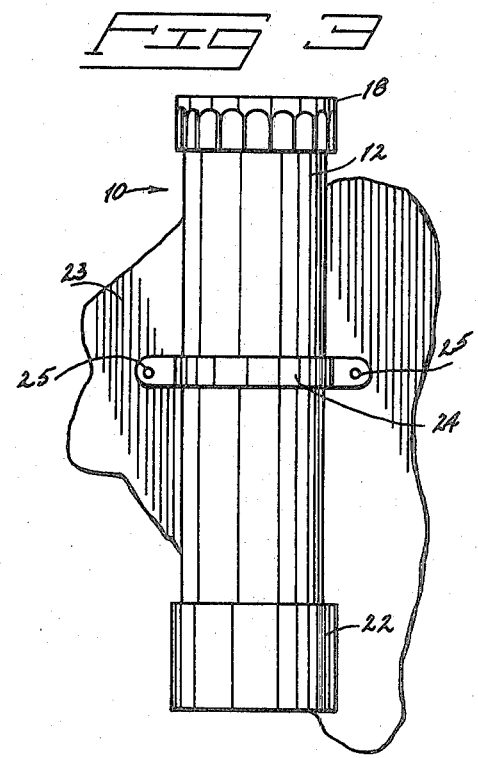

OIL SPOUT CONTAINER

TECHNICAL FIELD

My invention relates to storage devices for oil spouts.

BACKGROUND ART

Due to its viscosity and its ability to cling without being sticky, oil is an excellent lubricant. Vehicles with gasoline powered motors use oil almost exclusively as a lubricant.

During the course of operation of the gasoline powered motors the quality of the lubricating oil deteriorates due to friction and internal heat of the engine. Further losses of oil occur due to leakage through gaskets and evaporation. In addition, the oil used to lubricate the engines has a limited useful lubricating life and occasionally must be drained and replaced. Oil for replacing that oil lost during operation of the engine or for replacing that oil drained as part of routine servicing is marketed in cardboard cans with metal tops. To dispense the oil from the can, the can may be punctured with a can opener and the oil poured through a funnel into the engine oil filling receptacle.

Using a separate can opener and funnel is not as efficient as using a combination oil spout that punctures the can and provides a spout for guiding the oil into the engine oil filling receptacle. Such a spout is in common use at service stations, garages, and by the general public.

Due to its nature, an amount of oil is retained by the spout after use. The oil retained by the spout is a residue left after the spout has been used to transfer the contents of a can of new oil into an engine. When the spout is stored for later use, the oil tends to slowly drip off the spout and/or collect dust. After using the spout several times, a significant amount of oil will drip into the spout storage area creating a significant, oily mess. For this reason, the oil spout requires a special storage container.

In addition to being messy, oil dripping from the spout is wasted oil. Collecting the oil would eliminate the mess and would also eliminate the waste of the oil. Although only a few drops of oil may be collected each time the spout is used, a commercial establishment such as a service station could collect a considerable amount of oil in a short time when the volume of oil such a business sells is considered.

The problems of waste and mess in storing oil spouts have long been recognized. Like many other problems, there are solutions—but no ideal solutions. An inventive improvement over the prior oil spout handling equipment should solve the problem of mess and waste in a simple, convenient manner.

DISCLOSURE OF INVENTION

My invention is an oil spout container. It includes a tubular member having an open upper end adapted to receive the spout and an enclosed lower end adapted to retain the spout within the member.

The member's lower end is apertured to drain oil into an oil cup. The oil cup is removably engageable with the member's lower end.

A cap removably engageable with the member's upper end is provided to enclose the container.

BRIEF DESCRIPTION OF DRAWINGS

My invention is best understood by referring to the following figures in which:

FIG. 1 is an exploded pictorial of my invention;

FIG. 2 is a cross sectional view of an embodiment of my invention; and

FIG. 3 is a front view of an alternate embodiment of my invention.

BEST MODE FOR CARRYING OUT MY INVENTION

My invention is an improved container for storing oil spouts. By providing a sealing cap and an oil collection cup, the persistent problems of mess and waste generated by an oil spout are eliminated.

The oil spout container 10 (FIG. 1) includes an elongated tubular member 12. The tubular member 12 has an open upper end 14 and a conical enclosed lower end 15.

The tubular member's lower end 15 has a plurality of apertures 16. The tubular member's upper end 14 is open with an annular rim 17. It is possible that in other embodiments of my invention the tubular member's lower end 15 could be slotted and that the member's upper end 14 could be made with threads.

A cap 18 has a receiving groove 19 for receiving the rim 17 therein to enclose the tubular member's upper end 14. The cap 18 has a knurled gripping surface 20 about its outer circumference.

The lower end 15 fits into an oil cup 22. The tubular member 12 is readily engaged and disengaged from the oil cup 22.

In one embodiment of my invention, a bracket 24 (FIG. 3) having mounting flanges 25 holds the container 10 to an upright surface 23. In an alternate embodiment of my invention, the container 10 fits into a base mount 26. The base mount 26 is secured to a horizontal surface 29 by a fastener 28 inserted through a hole 27 in the base mount.

In operation, the tubular member 12 is oriented in a substantially vertical position. The spout 11 (FIG. 2) is inserted through the tubular member's open upper end 14 into the tubular member 12. The tubular member'enclosed conical lower end 15 holds the spout 11 in place in the member 12.

The spout is usually placed into the oil spout container 10 after use and contains a certain residual amount of oil. As the oil drips from the spout by the force of gravity, it flows toward the enclosed lower end 15 of the tubular member 12. The tubular member's lower end 15 is sloped concavely and the droplets of oil are directed toward the lower end's center.

Apertures 16 are formed in the enclosed lower end 15 to drain the oil dripping from the spout 11. The lower end 15 could be made with a slotted opening and function in a similar manner. The oil that has drained through the apertures 16 in the lower end 15 is accumulated in an oil cup 22. The oil cup releasably engages by friction with the tubular member's lower end 15. The tubular member's lower end and oil cup may also be threaded for engagement with each other. Oil accumulated in the oil cup 22 may be periodically drained by removing the cup 22 from the tubular member 12.

The tubular member 12 is enclosed at its upper end 14 by an enclosing cap 18. The cap 18 keeps dirt and debris out of the container 10 which, in turn, keeps the spout and the oil collected in the oil cup clean. The cap 18 in this embodiment has a receiving groove 19 that receives the rim 17 on the tubular member's open upper end 14. To assist in engaging and disengaging the cap, a knurled grip 20 is provided. A chain (not shown) may be included between the cap and the tubular member to keep the cap with the container at all times.

Because uses, available mounting surfaces, and applications of my invention vary, two of the possible embodiments for mounting the oil spout container 10 are included in the specification. A first embodiment mounts the container 10 to a substantially upright surface such as a wall (FIG. 3); another embodiment mounts the container 10 to a substantially horizontal surface, such as a tabletop or paper towel dispenser (FIG. 2).

To mount the container to an upright surface, a bracket 24 that partially encircles the tubular member 12 is provided. Mounting flanges 25 on the bracket may receive fasteners (not shown) to hold the container 10 to the upright surface. When the container 10 is mounted against an upright surface, the oil cup may be removed by pulling the cup from the tubular member's lower end 15.

To mount the container to a horizontal surface, a base mount 26 is provided. The base mount is fastened to the horizontal surface 29 by a fastener 28. The base mount 26 engages with the oil cup 22 of the container 10. When the container 10 is mounted to a horizontal surface, the oil cup 22 may be drained of accumulated oil by lifting the tubular member's lower end 15 from the oil cup 22 and then lifting the oil cup from the base mount 26.

With my invention, an oil spout can be handily stored for use in such a way as to prevent the mess and waste caused by dripping from the spout. The enclosing cap keeps dirt and other contaminants out of the container and the accumulated oil can then be reused.

The foregoing sets forth the best mode for practicing my invention. The extent of protection accorded should be limited only by the breadth of the following claims.

I claim:

1. An oil spout container comprising:
   a tubular member having an open upper end adapted to receive an oil spout and having an enclosed lower end adapted to retain the oil spout within the member, the lower end being apertured to drain oil from the member;
   said tubular member having a length between the open upper end and the enclosed lower end greater than the length of the oil spout;
   said open upper end having an annular rim;
   a cap frictionally removably mounted to the member's upper end to enclose the member;
   said cap having a complementary groove formed therein for slidably receiving the annular rim of the upper end of the tubular member to seal the upper end to prevent the oil from becoming contaminated;
   said cap having a knurled peripheral surface to enable the cap to be easily gripped and slidably mounted on and removed from the annular rim of the upper end of the tubular member;
   said enclosed lower end being conical shaped with a central apex to enable the oil to drain toward the apex; and
   said enclosed end having a plurality of apertures formed therein to enable oil to drain therethrough wherein at least some of the apertures are spaced from the apex to facilitate rapid draining;
   an oil cup frictionally removably mounted to the member's lower end for enclosing the aperture and for accumulating oil draining from the members through the aperture so that the oil cup serves both as an accumulator to store the draining oil and a frictional enclosure to the aperture to prevent the drained oil from becoming contaminated.

2. An oil spout container as claimed in claim 1 further comprising:
   a bracket encircling the container and having mounting flanges for retaining said container to an upright surface.

3. An oil spout container as claimed in claim 1, further comprising:
   a base mount removably engageable with the oil cup for retaining said container to a horizontal surface.

* * * * *